No. 802,539. PATENTED OCT. 24, 1905.
G. F. WARBURTON.
TROLLEY FOR ELECTRIC CARS.
APPLICATION FILED AUG. 6, 1904.
2 SHEETS—SHEET 1.
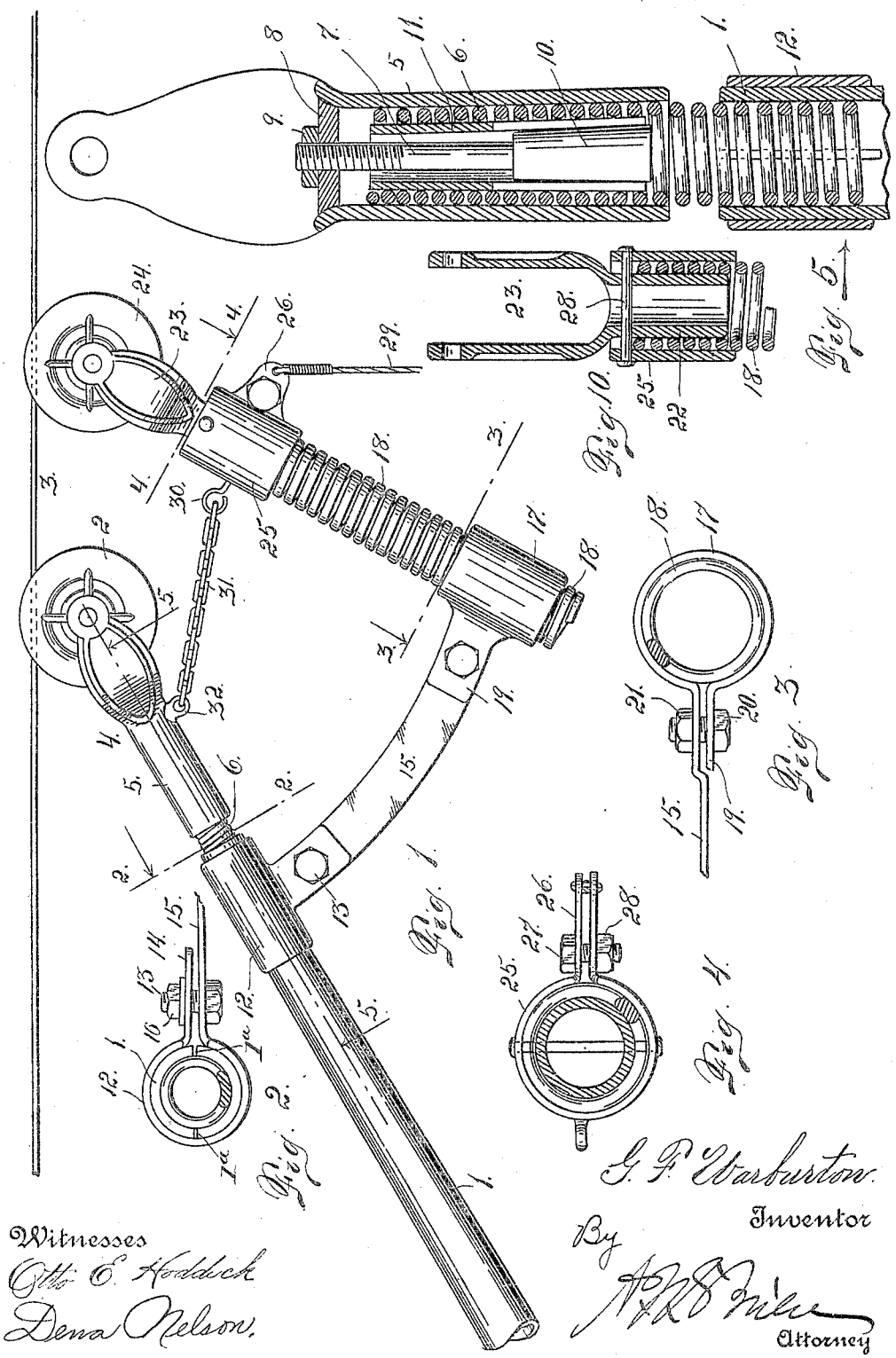
Witnesses
Otto E. Hoddick
Dena Nelson
G. F. Warburton
Inventor
By 
Attorney No. 802,539. PATENTED OCT. 24, 1905.
G. F. WARBURTON.
TROLLEY FOR ELECTRIC CARS.
APPLICATION FILED AUG. 6, 1904.
2 SHEETS—SHEET 2.
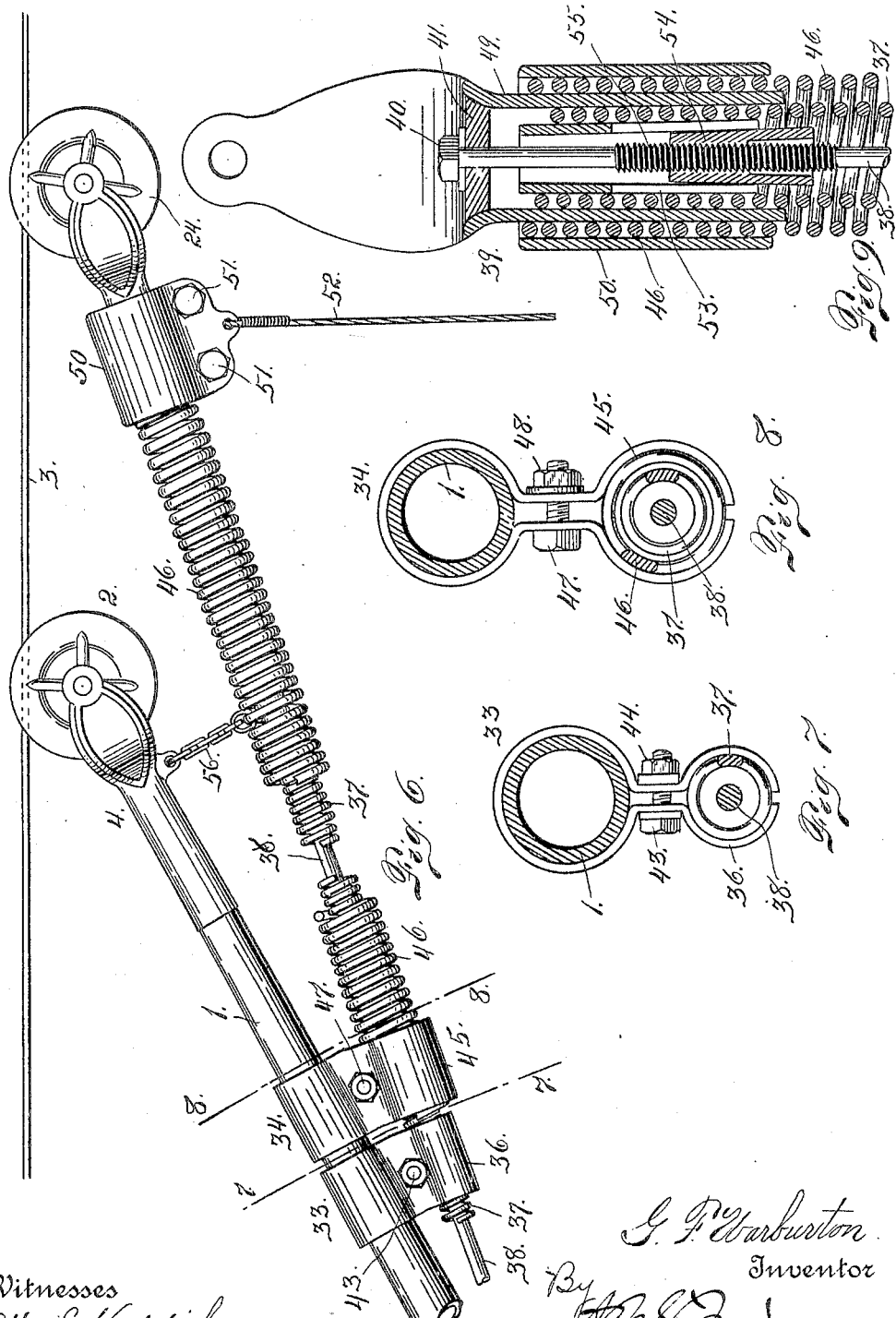

UNITED STATES PATENT OFFICE.

GEORGE F. WARBURTON, OF DENVER, COLORADO.

TROLLEY FOR ELECTRIC CARS.

No. 802,539.     Specification of Letters Patent.     Patented Oct. 24, 1905.

Application filed August 6, 1904. Serial No. 219,702.

*To all whom it may concern:*

Be it known that I, GEORGE F. WARBURTON, a citizen of the United States, residing in the city and county of Denver and State of Colorado, have invented certain new and useful Improvements in Trolleys for Electric Cars; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in trolleys for electric cars, my object being to provide an auxiliary trolley connected with the main trolley in such a manner that the electric current is conducted from the trolley-wire through the agency of both trolleys to the car. As the two trolley-wheels may be considerably separated on the wire, this construction has a tendency to prevent arcing and the burning of the wire and injury to the trolley incident thereto, since it is quite unlikely that both wheels will be out of contact with the wire simultaneously. My improved construction also has a tendency to prevent the trolley from slipping off the wire, since the auxiliary trolley, which follows the main trolley, gives additional security in this regard. In my improved construction the harps of both trolley-wheels are yieldingly connected with the main-trolley pole whereby the trolleys may swing up and down and from side to side as circumstances may require. The two trolleys are also so connected that they may occupy different vertical planes longitudinally of the wire, since either trolley may vary considerably in its lateral movement from the other. It is evident that in making turns the two trolleys cannot occupy the same plane. Moreover, in case the trolley-wire is coated with ice or other foreign substance the main-trolley wheel has a tendency to clear the wire, whereby the auxiliary trolley is allowed to come in direct contact therewith, and thus conduct the current to the car under circumstances which with a single trolley would cause the car to stop by reason of no current.

Having briefly outlined my improved construction, as well as the function it is intended to perform, I will proceed to describe the same in detail, reference being made to the accompanying drawings, in which is illustrated an embodiment thereof.

In the drawings, Figure 1 is a side elevation illustrating my improved trolley construction. Figs. 2, 3, and 4 are sections taken on the line 2 2, 3 3, and 4 4, respectively, of Fig. 1. Fig. 5 is a longitudinal section taken through the main trolley harp and holder on the line 5 5, Fig. 1. Fig. 6 shows another form of construction. In this view the spring 37 is partly broken away to disclose the rod 38. Figs. 7 and 8 are sections taken on the lines 7 7 and 8 8, respectively, of Fig. 6. Fig. 9 is a section taken through the harp of the auxiliary trolley shown in Fig. 6. Fig. 10 is a section taken through the form of auxiliary harp shown in Fig. 1.

The same reference characters indicate the same parts in all the views.

Referring first to Fig. 1 to 5, inclusive, and Fig. 10, let 1 designate the trolley-pole; 2, the trolley-wheel; 3, the overhead wire engaged by the wheel, and 4 the harp in which the trolley-wheel is revolubly mounted. The jaws or sides of this harp, between which the wheel rotates, are connected by a sleeve 5, which fits over a coil-spring 6, surrounding a centrally-located rod 7, which passes through a base-plate 8, located between the harp-arms and the sleeve, the rod being threaded at its upper extremity and held in place by a nut 9. The inner extremity of this rod is provided with a frusto-conical part 10, located within a split tube 11, the latter being placed inside of the coil-spring 6. The construction and arrangement of the parts is such that as the cone-shaped part 10 is drawn upwardly by turning the nut 9 in the proper direction the tube 11 will be expanded, whereby the spring is clamped between the said tube and the sleeve 5. In this manner the harp is securely connected with the upper extremity of the spring 6. The lower extremity of this spring enters the upper extremity of the trolley-pole 1, which is hollow and slotted, as shown at 1ª, the trolley-pole being secured to the spring by a clamp 12, which surrounds the upper end of the pole and is secured thereto by a bolt 13, which passes through openings formed in an ear 14 and a part 15. A nut 16 is applied to this bolt, whereby the trolley-pole is clamped in place on the spring. The part 15 is provided with an ear opposed to the part 14, but extends downwardly to a clamp 17, which passes around the lower extremity of a coil-spring 18, the clamp 17, having an ear 19, provided with an opening registering with an opening in the opposing part 15, through which a bolt 20 is passed and secured by a nut 21. The upper extremity of the trolley-pole 1 is slotted to permit the necessary expansion and contraction in order to clamp the spring 6 therein. The upper extremity of the spring 18 surrounds the hollow shank 22 of a harp 23, carrying the auxiliary trolley 24. Surrounding the upper extremity of the spring where the latter receives the shank 22 of the harp is a clamp 25, whose ears 26 are connected by a bolt 27, to which is applied a nut 28, whereby the upper extremity of the spring is secured tightly between the shank of the harp and the clamp. For additional security a pin 28 is passed transversely through registering openings formed in the clamp 25 and the harp-shank 22, its opposite extremity being riveted or otherwise suitably secured. The ears 26 of the clamp 25 are apertured at their lower extremities to permit their connection with the trolley-rope 29, which hangs downwardly and is accessible to the conductor or person in charge of the car for the purpose of controlling the multiple-trolley device. The clamp 25, as shown in the drawings, is provided with a screw-eye 30, with which is connected one extremity of a chain 31, whose opposite extremity is connected with an eye 32, made fast to the shank of the harp 4 of the main-trolley wheel. This chain forms a flexible connection between the two trolleys for keeping the same in the proper relative position, but at the same time allowing either trolley a lateral or vertical movement independently of the other. From the foregoing description the use of this form of the trolley structure will be readily understood. The part 15 forms a rigid connection between the clamps 12 and 17 or a rigid connection between the two trolley devices. Each trolley-wheel, however, is connected with the rigid part upon which it is supported by a coil-spring, which permits the necessary change of position in all directions incident to its use.

In the form of construction shown in Figs. 6 to 9, inclusive, the trolley-pole 1, together with the harp 4 and the trolley-wheel 2, are of ordinary construction and connected in the ordinary way. The upper part of the trolley-pole is provided with two clamping devices 33 and 34, respectively. Each of these clamps has a member surrounding the trolley-pole. The opposite member 36 of the clamp 33 surrounds the lower extremity of a coil-spring 37, through which passes a rod 38. The opposite extremity of this rod is connected with an auxiliary harp 39, by means of a head 40, the rod passing through the base 41 of the harp. The two clamp members are secured tightly to their engaging parts by means of a bolt 43, which passes through openings formed in the clamp parts between the two members. This bolt is fastened in place by a nut 44. One member, which I will designate 45, of the clamp 34 surrounds a larger coil-spring 46, the two clamp members being connected by a bolt 47, secured by a nut 48. The coil-spring 46 surrounds the spring 37 except at its lower extremity, where the spring 46 is absent, in order that the clamp member 36 may directly engage the smaller spring 37. The upper extremity of the spring 37 enters the hollow shank or sleeve 49 of the harp 39, while the larger spring 46 surrounds the sleeve 49 exteriorly. Outside of the upper extremity of the spring 46 is located a clamp 50, held in place by bolts 51, which pass through the ears or flanges of the clamp. A trolley-rope 52 is connected with this clamp. The clamp 50 is tightly secured to the upper extremity of the spring 46. Inside of the upper extremity of the spring 37 is located a split tube 53, and within the split tube is located a frusto-conical part 54, provided with an interiorly-threaded opening through which passes the threaded part 55 of the rod 38. By turning the rod 40 in the direction to cause the part 54 to travel in the split tube 53 the tube will be expanded and the upper extremity of the spring 37 secured tightly to the shank of the harp. The spring 46 is connected with the harp of the main trolley by a chain 56 or other suitable flexible device. Within the harp 39 is mounted the auxiliary trolley 24. The two clamps 33 and 34 form a rigid connection between the parts engaged by their respective members, while the chain 56 allows the two trolley members above the clamps to change their position as often as may be necessary in the performance of their function. It will be observed that the auxiliary trolley 24 in this form of construction may move laterally or upwardly and downwardly, as may be desired, without interfering with the main trolley device, since the two coil-springs 37 and 46, together with the rod 38, form a flexible connection between the rigid clamps and the auxiliary trolley. The rod 38 is of such size that it will bend freely and permit the necessary lateral and vertical movement of the auxiliary trolley.

Having thus described my invention, what I claim is—

1. The combination with a trolley-pole and a trolley, of an auxiliary trolley, a coil-spring having one extremity connected with the harp of the auxiliary trolley, a flexible connection between the harps of the two trolleys, a clamp connected with the lower extremity of the said spring, and a rigid connection between the trolley-pole and the said clamp.

2. The combination with a trolley-pole, and a trolley connected therewith, of an auxiliary trolley, a harp in which the trolley is mounted, a coil-spring having one extremity connected with the harp, a flexible connection between the harps of the two trolleys, and a rigid connection between the trolley-pole and the lower extremity of the coil-spring of the auxiliary trolley.

3. The combination with a harp, a trolley and trolley-wheel, the shank of the harp being hollow, a coil-spring entering the hollow shank of the harp, a split tube located within the portion of the coil-spring within the harp, and a frusto-conical device inserted in the split tube and adapted to expand the same whereby the spring is clamped within the harp.

4. The combination with a harp and trolley, the shank of the harp being hollow, a coil-spring inserted within the hollow of the shank of the harp and extending below the same, a split tube located within the portion of the spring which enters the shank of the harp, a conical device located within the split tube, a rod connected with the conical device and passing through the base of the harp, and a nut threaded on the rod whereby the conical device may be adjusted within the split tube for the purpose set forth.

5. The combination with a trolley-pole and trolley, of an auxiliary trolley and harp, a rod whose upper extremity is connected with the harp of the auxiliary trolley, two coil-springs surrounding the rod one within the other, the inner coil-spring extending somewhat below the outer coil-spring, and clamps rigidly connecting the trolley-pole with the respective springs, substantially as described.

6. The combination with a trolley-pole and a trolley, of an auxiliary trolley comprising a trolley-wheel, a harp, a rod whose upper extremity is connected with the harp of the auxiliary trolley, two coil-springs surrounding the rod one within the other, means for rigidly connecting the lower extremities of the coil-springs with the trolley-pole, and a flexible connection between the harp of the main trolley and the outer coil-spring for the purpose set forth.

7. In a trolley construction, the combination of a trolley wheel and harp, a rod connected with the harp and having a threaded portion passing through the hollow shank of the harp and extending below the same, two coil-springs one located within the other and extending below the harp, the upper extremity of one spring entering the hollow shank of the harp and the upper extremity of the other spring surrounding the shank of the harp, a split tube located within the upper extremity of the inner spring, a conical device located within the split tube and threaded to engage the threaded part of the rod whereby the said device may be longitudinally adjusted within the tube whereby the latter is expanded, and a clamp secured to the upper extremity of the outer spring.

In testimony whereof I affix my signature in presence of two witnesses.

GEORGE F. WARBURTON.

Witnesses:
 DENA NELSON,
 A. J. O'BRIEN.